(12) United States Patent
Abercrombie

(10) Patent No.: US 6,494,932 B1
(45) Date of Patent: Dec. 17, 2002

(54) RECOVERY OF NATURAL NANOCLUSTERS AND THE NANOCLUSTERS ISOLATED THEREBY

(75) Inventor: Hugh J. Abercrombie, Calgary (CA)

(73) Assignee: Birch Mountain Resources, Ltd., Calgary (CA)

(*) Notice: Subject to any disclaimer, the term of this patent is extended or adjusted under 35 U.S.C. 154(b) by 3 days.

(21) Appl. No.: 09/575,661

(22) Filed: Jun. 6, 2000

(51) Int. Cl.[7] ................................................. B22F 9/16
(52) U.S. Cl. ........................... 75/343; 75/351; 75/370; 423/22; 423/23
(58) Field of Search ........................... 75/343, 351, 370

(56) References Cited

U.S. PATENT DOCUMENTS

| | | | |
|---|---|---|---|
| 3,150,960 A | 9/1964 | Hunter | |
| 3,238,038 A | 3/1966 | Hunter | |
| 3,957,603 A | 5/1976 | Rhodes | |
| 3,958,985 A | 5/1976 | Anderson | |
| 3,979,205 A | 9/1976 | Wanzenberg | |
| 4,259,107 A | 3/1981 | Guay | |
| 4,268,307 A | 5/1981 | Michel | |
| 4,892,631 A | 1/1990 | White | |
| 5,215,575 A | 6/1993 | Butler | |
| 5,358,695 A * | 10/1994 | Helble et al. | 423/592 |
| 5,395,604 A * | 3/1995 | Harris et al. | 423/335 |
| 5,405,430 A | 4/1995 | Groves et al. | |
| 5,523,065 A * | 6/1996 | Stangle et al. | 423/71 |
| 5,785,736 A | 7/1998 | Thomas et al. | |
| 5,814,370 A | 9/1998 | Martino et al. | |
| 5,837,025 A * | 11/1998 | Auchter-Krummel et al. | 65/21.1 |
| 5,916,534 A | 6/1999 | Butler | |
| 5,928,517 A | 7/1999 | Smith et al. | |
| 5,958,329 A | 9/1999 | Brown | |
| 6,025,034 A * | 2/2000 | Strutt et al. | 427/450 |
| 6,126,740 A * | 10/2000 | Schulz et al. | 117/4 |
| 6,131,835 A | 10/2000 | Johnson | 241/21 |
| 6,131,836 A | 10/2000 | Johnson | 241/30 |

FOREIGN PATENT DOCUMENTS

| | | | |
|---|---|---|---|
| AU | 41997/93 | * | 1/1994 |
| WO | WO 99/31286 | | 6/1999 |

OTHER PUBLICATIONS

Excerpt from the text of the report outlining the various SEM reports.

SEM report from Cannon Microprobe to LAC Explorations in Vancouver, B.C., dated Aug. 22, 1994.

SEM report from Cannon Microprobe to LAC Explorations in Vancouver, B.C., dated Sep. 23, 1994.

SEM report from Amtel to LAC Explorations in Vancouver, B.C. dated Sep., 1994.

SEM report from the Alberta Geological Survey (AGS) from work conducted Sep. 1994.

SEM report from Durban Laboratories dated Sep. 1994.

Reports on SEM examinations conducted by LAC Minerals, Denver, during 1994.

H. Abercrombie, et al., "Geological Setting and origin of Microdisseminated Au–Ag–Cu Minerals, Fort MacKay Region, Northeastern Alberta.", Geological Survey and Canada Bulletin 500, 1997.

(List continued on next page.)

*Primary Examiner*—George Wyszomierski
(74) *Attorney, Agent, or Firm*—Oblon, Spivak, McClelland, Maier & Neustadt, P.C.

(57) ABSTRACT

Methods for recovery of naturally occurring nanoclusters are provided involving providing an aqueous nanocluster slurry and desorbing the nanoclusters from the surface of host substrate on which the nanoclusters are bound, followed by isolating the desorbed nanoclusters, and the isolated naturally occurring nanoclusters obtained thereby.

58 Claims, 7 Drawing Sheets

OTHER PUBLICATIONS

Ballantyne, et al., "Alluvial Platinum–Group Minerals and Gold in Alberta: Results from the Orientation Studies Project and Their Significance to Exploration.", Geological Survey and Canada Bulletin 500, 1997.

Fedikow, et al., "Prairie–type micro–disseminated Au mineralization—a new deposit type for Manitoba's Phanerozoic rocks (NTS 636C/14)", Manitoba Energy and Mines, Minerals Division, Report of Activities, 1996, p. 108–121.

G. De Paoli, "Sample Descriptions and Report on Petrographic and SEM Examinations of Polished Thin Section and Rock Chip Samples from the Ft. McKay Area, N.E. Alberta.", Mar. 1997.

G. De Paoli, SEM report of Four rock Samples and Three Fire Assay Beads, Mar. 1999.

B. Tsang, "The Origin of the Beaver River Sanstone", MSc thesis, University of Calgary, 1998.

S. Ramnath, "Prairie–Type Mineralization: A Mineralogical and Geochemical Study of Solution Chimneys in the Mafeking Quarry, Manitoba, Canada.", BSc thesis, University of Manitoba, 1999.

H. Abercrobie, "Prairie–Type Sedimentary Au–Ag–Cu", Geological Survey of Canada, Calgary, in New Mineral Deposit Models for the Cordillera, Northwest Mining Association, short course notes, 15–122, 1996.

R. Feng, et al., "Disseminated Au–Ag–Cu mineralization in the Western Canadian Sedimentary Basin, Fort MacKay, northeastern Alberta: a new gold deposit type", In Current Research 1994–E, Geological Survey of Canada, p. 121–132.

A. P. Alivisatos, "Enhanced: Naturally Aligned Nanocrystals", Science Magazine web site, Biomineralization, pp. 1–7.

J. Banfield, et al., "Aggregation–Based Crystal Growth and Microstructure Development in Natural Iron Oxyhydroxide Biomineralization Products", Science, vol. 289, Aug. 2000, pp. 751–754.

M. Labrenz, et al., "Formation of Sphalerite (ZnS) Deposits in Natural Biofilms of Sulfate–Reducing Bacteria", Science, vol. 290, Dec. 2000, pp. 1744–1747.

H. Abercrombie, "Prairie–Type Sedimentary Au–Ag–Cu", in New Mineral Deposit Models for the Cordillera, British Columbia geological Survey, short course notes, pp. J1–J20, 1996.

D. Mossman, et al., "Microbial Processes in Gold Migration and Deposition: Modern Analogues to Ancient Deposits", 1999, vol. 26, No. 3, pp. 131–140.

S. Sugano, et al., "Microcluster Physics", including book cover, title page, publication information page, and pp. 44–47, 1998.

D. Bowman et al., "Calcium Inhibition of Polyacrylamide Gel hydration Is Partially Reversible by Portassium", Hortscience, vol. 26, pp. 1063–1065, 1991.

D. Bowman, et al., "Fertilizer Salts Reduce Hydration of Polyacrylamide Gels and Affect Physical Properties of Gel–amended Container Media", Journal of the American Society for Horticultural Science, vol. 115, pp. 382–386, 1990.

L. D'Onofrio, et al., "Naturally Ferrihydrite nanoparticles studied by Mossbauer spectroscopy, Magnetic susceptability and electron microscope.", School of Physics, Faculty of Sciences, UCV, Venezuela, 1967, translated Abstract only.

Database WPI, Derwent Abstracts, AN 1994–066085, 1 page, Au 41997 93, Jan. 20, 1994.

Database WPI, Derwent Abstracts, AN 2000–315736, 1 page, RU 2 130 499, May 20, 1999.

* cited by examiner

*FIG. 4A*  SOLID NANOCLUSTER SOURCE MATERIAL

→ OP:PREVENT FROM DRYING
→ CRUSH
→ MILLING

↓ NANOCLUSTERS + HOST SUBSTRATE + GANGUE ± WATER

→ SLURRY
⇒ TO NANOCLUSTER COLLOID PROCESSING

*FIG. 4B*  AQUEOUS LIQUID NANOCLUSTER SOURCE MATERIAL

→ OP:PREVENT FROM DRYING
    ⇒ OP: TO NANOCLUSTER COLLOID PROCESSING
→ PHASE SEPARATION
  • WATER: to water treatment or recycle
  ↓ NANOCLUSTERS ± HOST-SUBSTRATE ± GANGUE

→ SLURRY
⇒ TO NANOCLUSTER COLLOID PROCESSING

FIG. 4C  ORGANIC LIQUID NANOCLUSTER SOURCE MATERIAL

→ OP: PREVENT FROM DRYING
→ PHASE SEPARATION
- WATER: to aqueous liquid pretreatment, water treatment or recycle
- ↓ ORGANIC LIQUID + NANOCLUSTERS ± HOST-SUBSTRATE → PHASE SEPARATION
- ORGANIC LIQUID: to hydrocarbon processing
- ↓ NANOCLUSTERS ± HOST-SUBSTRATE ± GANGUE

→ SLURRY
⇒ TO NANOCLUSTER COLLOID PROCESSING

FIG. 4D  GASEOUS NANOCLUSTER SOURCE MATERIAL

→ CONDENSOR
→ SCRUBBER(S)
- GAS: to gas processing
- ↓ WATER + NANOCLUSTERS ± HOST-SUBSTRATE
⇒ OP: TO NANOCLUSTER COLLOID PROCESSING → PHASE SEPARATION
- WATER: to water treatment or recycle
- ↓ NANOCLUSTERS ± HOST-SUBSTRATE

→ SLURRY
⇒ TO NANOCLUSTER COLLOID PROCESSING

- NANOCLUSTERS ± HOST SUBSTRATE ± GANGUE ± WATER (from pretreatment)

→ OP: SLURRY CONDITIONING
    → OP: PHASE SEPARATION

- WATER: to water treatment or recycle
        ↓ ORGANIC LIQUID + NANOCLUSTERS + HOST-SUBSTRATE → COLLOID REGENERATION
    → GEL HYDRATION
    → COLLOID PEPTIZATION
    → OP: HEAT & PRESSURE TREATMENT
    → DISPERSION
    → NANOCLUSTER COLLOID DESORPTION
    → PHASE SEPARATION

- DEPLETED HOST SUBSTRATE + GANGUE: to recycle or tailings
        ↓ AQUEOUS NANOCLUSTER COLLOID SOLUTION → NANOCLUSTER COLLOID RECOVERY
    → PHASE SEPARATION, or
    → ADSORPTION

- WATER: to water treatment or recycle
        ↓ NANOCLUSTER CONCENTRATE

→ OP: REFINE
    ↓ MACROCRYSTALLINE SOLID PRODUCT

*FIG. 5*

RECOVERY OF NATURAL NANOCLUSTERS AND THE NANOCLUSTERS ISOLATED THEREBY

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

Description of Related Art

The recovery and purification of metals from metal-bearing ores has been practiced for millennia whereby metal containing substances, including native metals and metal salts, metal sulphides, metal oxides and various other forms are subjected to various recovery procedures to produce high purity metals or alloys. Non-metallic elements also have been recovered and purified by various other processes, some of which rely on recovery of the elements from a liquid state, as exemplified by the recovery of salts from brines, or from the gaseous state, as exemplified by the recovery and purification of gases from air.

Throughout history and continuing to the present, the selection of a particular ore for the recovery of elements of value is normally first made on the basis of visual indications of the presence of the element of interest or the presence of alteration minerals known to be associated with it. For example, although visible gold is not normally seen in gold deposits, minerals such as quartz, arsenopyrite and arsenian pyrite commonly are associated with gold, and their presence in a rock alerts the geologist to the possibility that the rock may contain gold in significant quantities. Similarly, exploration geologists and prospectors searching for copper will be alerted to the presence of a potential copper deposit by the bright blue and green colours of the minerals azurite and malachite which are the weathering products of copper mineral oxidation.

Accordingly, a useful prerequisite to recovering an element from a particular source material is a visual indication that the source material is enriched in the element sought. For base metals such as copper, and other substances of relatively lower value, visual estimates of the concentration of the element sought in the source material usually correspond well with the amount that is ultimately recovered. However, gold and precious metals and other elements of relatively higher value can occur in economically significant concentrations without visual indications of their presence or their enrichment.

It is desirable that accurate methods for determining the concentrations of gold and precious metals and other high-value elements are available when developing procedures for the recovery of these materials. Fire assay is an example of such a technique. Fire assays have been used for thousands of years to determine the concentrations of gold, silver and other precious metals in ores, rocks and concentrates. Fire assay works by segregating and concentrating the precious metals contained within the source material into a small bead from which the concentrations of the precious metals can be determined, either by weighing or, as is common today, by dissolving the bead in acid(s) and measuring its elemental composition by instrumental analysis.

Other methods have been used to determine the concentrations of metals and other elements in natural materials. The optical microscope and the more recently developed scanning electron microscope (SEM) and electron microprobe (EMP) have extended the range of visual estimation of element concentrations to the micron to sub-micron scale. Other instruments such as the transmission electron microscope (TEM) have extended the range of visual determination of element abundance to the scale of the atom. Various analytical techniques such as energy dispersive x-ray analysis can be used during electron imaging to determine the chemical composition of the substrate under the electron beam. These tools extend the ability of the geochemist and metallurgist to correlate between visual and chemical estimates of element concentrations from the macroscopic scale to the atomic scale. As such, they serve as a complementary method to chemical analysis for estimating the concentrations of small quantities of elements of high value.

These varying methods of determining useful content of metals have from time to time given differing results. That is, assessing a particular ore by the fire assay method may not show any significant concentration of the desired end product, whereas analysis using the SEM or EMP techniques may show the presence of such metals or products.

SEM and EMP examination of sedimentary rocks from selected areas in western Canada by a number of competent agencies has documented previously unknown occurrences of micron to submicron sized particles of native metals and intermetallic alloys. Amongst the metals identified by electron imaging as occurring in this form are the base metals chromium, manganese, iron, nickel, copper and zinc, and the precious metals including gold, silver and the platinum group metals (PGM). They are accompanied by a wide variety of other metallic and non-metallic elements. In all, some 56 elements of the periodic table have been identified as occurring in this form in these rocks. These deposits have been called "Prairie-type" deposits. Fire assay of these rocks for gold, platinum and palladium and other precious metals, however, typically returns values at or below their respective lower limits of detection. Therefore, the concentrations of precious metals in these rocks can not be accurately determined by conventionally practiced analytical techniques.

Allusion to difficulties in the detection and recovery of precious metals from ores containing precious and other metals has been set out in the literature and various attempts have been made to recover such metals from these ores by a variety of processes. For example, in Hunter, U.S. Pat. Nos. 3,150,960 and 3,238,038, there are disclosed processes for the recovery of platinum, gold, silver, palladium, ruthenium, iridium, rhodium and osmium from bituminous shales which conventional fire assay procedures frequently showed to be barren of these metals. Hunter's work, directed particularly toward the recovery of gold and PGM's, postulated that the precious metals, which occur in the "shales", had a tendency to resist "all heretofore known procedures for recovering them economically," were in a colloidal form or were "entangled" with silica particles, and thus were not accessible to the action of conventional agents of recovery.

Similarly in Anderson, U.S. Pat. No. 3,958,985, there is disclosed an extraction method for non-ferrous metals for the recovery of precious metals and other non-ferrous metals from, "so-called unassayable ores wherein the minerals are combined in such a way that they cannot be analyzed by conventional techniques". Anderson disclosed that many ores contain both conventionally detectable and recoverable metals including precious metals and other precious and base metals that are not normally detected. That is, the then-current assay methods "identified only a portion of the metal present in the sample". Anderson gives no information as to the precise nature of the precious or other non-ferrous metals.

More recently Butler, U.S. Pat. No. 5,215,575, disclosed a process for processing noble metal-containing ores at low pulp densities where the noble metals are reported to be, " . . . in extremely fine form and are often present in higher concentrations than is revealed by normal assay techniques in common use". In Butler, the presence of metal-absorbing substances, specifically clays, carbon or sulphides, is suspected to remove some of the metals from solution so that they cannot be detected by instrumental analysis. This mechanism is invoked to explain the loss of gold from cyanide leach recovery and aqua regia assay solutions, as well as loss of gold to slag in fire assay.

Although natural occurrence of nanoclusters has not been reported in the technical literature, manufactured nanoclusters are known and are becoming increasingly important in the fields of catalysis, ceramics, semiconductors, and materials science, among others. Their importance is due to the high ratio of surface atoms to interior atoms in nanoclusters. This imparts properties such as high surface reactivities, increased hardness and yield strength, decreased ductility, liquid-like behaviour at low temperature, and size-related quantum effects that are distinct from those properties of their macro-scale counterparts.

A method for production of nanoclusters at a high rate is disclosed in Brown, U.S. Pat. No. 5,958,329, wherein nanoclusters are produced by using an electron beam gun under high vacuum to vaporize source materials, which vapor is cooled in a condensation chamber to produce nanoclusters at claimed rates of up to kilograms per hour. Another method for artificially producing monodisperse sized nanoclusters is disclosed in Martino, U.S. Pat. No. 5,814,370.

CONCEPTS AND DEFINITIONS

At its finest division an element consists of a single atom. Molecules consist of simple aggregates of a few atoms, and metals and other macrocrystalline solids comprise a crystalline lattice extending outwards in continuous, three dimensional arrays of atoms. The dimensions of atoms and molecules are measured in angstroms ( ), one angstrom being 10-10 m or 0.1 nanometers (one nanometer, or nm, being 10-9 meter). Crystalline domains in macrocrystalline solids such as metals typically are measured on the scale of micrometers (micron or $\mu$m) which is 10-6 meter. Nanoclusters occupy the transition from the simple atomic/molecular state to the crystalline state and have diameters in the range of 0.1 to about 100 nm. They consist of atomic polyhedra made up of as few as three or as many as thousands of atoms. Numerous terms have been used to describe nanoclusters. Smaller, charged nanoclusters are referred to as polyanions and polycations. Larger entities are referred to as microclusters, clusters or nanoparticles, although the more apt term nanocluster is now more commonly coming into use and has been adopted herein. Adjectives such as "nanophase", "nanocrystalline" and "nanoscale" are also used to distinguish nanoclusters from their macroscale counterparts.

Within the context of the present invention, the following definitions are used:

"Atom" refers to the entity making up the smallest division of an element.

"Molecule" refers to entities comprising simple combinations of a few atoms with fixed chemical, physical and quantum properties.

"Nanocluster" refers to particles in the 0.1 to 100 nm size range which exhibit size-dependent variations in chemical, physical and quantum properties.

"Nanocluster gel" refers to aggregates of dehydrated colloidal nanoclusters which commonly form micron to sub-micron sized particles.

"Macrocrystalline solids" refers to crystalline substances, such as metals, that exhibit no size-dependent variation in chemical, physical or quantum properties, and whose crystal size is typically one micron or greater.

Throughout this disclosure and claims, the term "metals" is intended to include precious or noble metals comprising gold, silver and the platinum group metals (PGM) platinum, palladium, osmium, iridium, ruthenium and rhodium, group I alkali metals, group II alkaline earth metals, group III to group XII transition metals, and other metallic elements including aluminum, silicon, gallium, germanium, arsenic, indium, tin, antimony, tellurium, thallium, lead, bismuth, thorium and uranium, and the rare earth elements.

FIELD OF THE INVENTION

This invention relates to the field of metallurgy. In particular, the invention relates to the recovery of extremely small, naturally occurring particles known as nanoclusters, from host materials comprising solids, liquids and gases, and the resulting nanoclusters isolated thereby.

BRIEF SUMMARY OF THE INVENTION

One object of the present invention is to provide a method for the detection and recovery of nanoclusters from nanocluster-bearing materials.

A further object of the present invention is to provide a method for the detection and recovery of metal nanoclusters from natural materials.

A further object of the present invention is to provide a method for recovery of metals from naturally occurring nanoclusters.

A further object of the present invention is to provide isolated natural nanoclusters of precious metals and/or PGM's.

These and other objects of the present invention have been satisfied by the discovery that nanoclusters do, in fact, occur naturally. Heretofore these particles have not been observed and no attempt has been made to separate such naturally occurring nanoclusters for purposes of recovering metallurgically significant materials.

Accordingly, this invention further relates to a process for recovering naturally occurring nanoclusters from nanocluster-bearing source material in which the nanoclusters can be demonstrated to occur: i) as discrete nanoclusters which may be adsorbed to a host substrate, ii) as nanocluster colloids, or iii) as nanocluster gels, the process comprising forming an aqueous nanocluster slurry comprising the nanoclusters and host substrate, contacting the slurry with peptizing reagents to cause the formation of nanocluster colloids and isolating the nanocluster colloids.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4A is a flow process diagram of a pretreatment process of a solid nanocluster source material, in accordance with the invention.

FIG. 4B is a flow process diagram of a pretreatment process of an aqueous liquid nanocluster source material, in accordance with the invention.

FIG. 4C is a flow process diagram of a pretreatment process of an organic liquid nanocluster source material, in accordance with the invention.

FIG. 4D is a flow process diagram of a pretreatment process of a gaseous nanocluster source material, in accordance with the invention.

FIG. 5 is a flow process diagram for nanocluster colloid processing, in accordance with an embodiment of the invention.

DETAILED DESCRIPTION OF THE INVENTION

Figure 1:
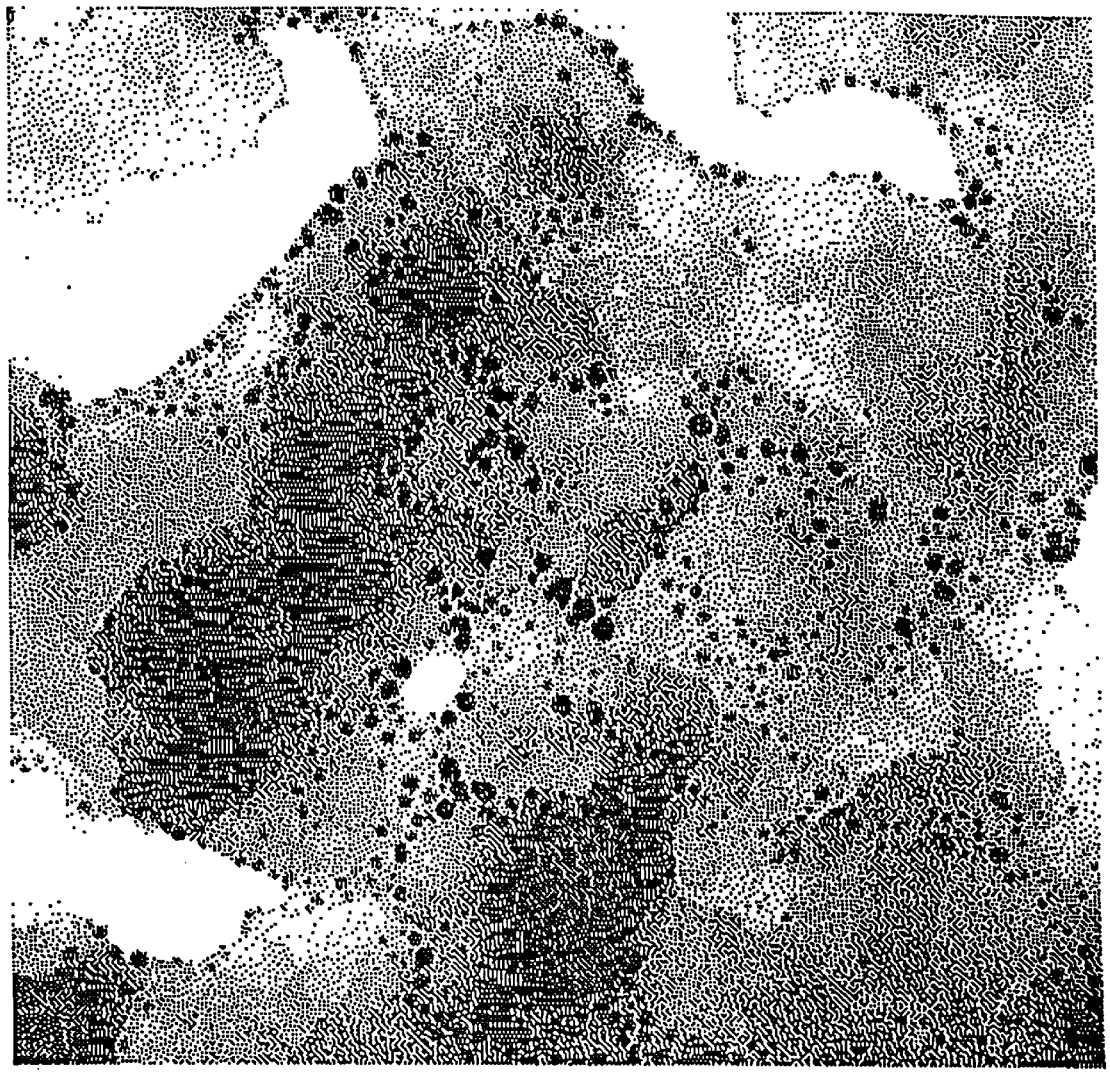
FIG. 1 is a TEM image of naturally occurring copper nanoclusters in sedimentary rock from northeastern Alberta, Canada.

The present invention relates to methods for recovery of naturally occurring nanoclusters from nanocluster bearing source materials and the isolated nanoclusters obtained thereby. The method of the present invention can be used on any form of nanocluster-bearing source material, whether solid, liquid or gas. In particular, the method comprises desorption of the nanoclusters from the source material to form an aqueous nanocluster slurry, followed by isolation of the nanoclusters from the slurry.

Preferably, the method of the present invention comprises contacting the nanocluster-bearing source material with water to prevent dehydration of the source material and to form an aqueous slurry of the nanoclusters and host substrate. The aqueous slurry is then contacted with one or more peptizing reagents in order to form nanocluster colloids. These colloids are then isolated by any of a variety of methods.

For example, the aqueous slurry can be diluted and dispersants added to disperse the host substrate within the resulting aqueous solution. The pH of the aqueous solution is then modified in such a manner that the nanocluster colloids are desorbed from the host substrate to form an aqueous nanocluster colloid solution. Adjustment of the pH of the aqueous solution will depend on the type of nanocluster colloid and type of host substrate, and is discussed in more detail below. Thereafter, the resulting aqueous nanocluster colloid solution is processed to separate the solution from the host substrate and gangue by any conventional separation technique, including, but not limited to, gravity settling, centrifugation or filtration.

The process further comprises recovering the nanocluster colloids from the aqueous nanocluster colloid solution, using conventional separation techniques, including but not limited to, sorption, ion exchange, electrolysis, coagulation, flocculation, filtration, centrifugation or dialysis, to form a nanocluster concentrate. The nanocluster concentrate can be used as is, or can be further processed to recover macrocrystalline solids by dissolution followed by precipitation, electrowinning, cementation, or by a combination of heat and pressure treatment under controlled atmosphere conditions using appropriate fluxes, fusion reagents and collectors to produce a macrocrystalline solid.

It is now understood that the reason for the poor correspondence between various methods of assaying precious metals is due to the presence of nanometer sized monatomic and polyatomic particles, or nanoclusters, in certain rocks. Nanometer sized particles have been observed by TEM in rocks from the same selected areas in western Canada where SEM and EMP investigations have revealed the occurrence of micron to sub-micron sized native metal, and intermetallic and polyatomic "alloy" particles. It is here proposed that these nanometer sized particles, or nanoclusters, comprise a newly discovered form of naturally occurring elements within the earth's crust. Their small size makes them invisible to SEM and EMP examination. Their size and composition can only be resolved by TEM analysis. Furthermore, the larger, micron to sub-micron sized particles are not alloys in the conventional sense. Rather they are gels comprising aggregates of dehydrated nanocluster colloids. Their intermetallic polyatomic compositions may have been produced via the process of spontaneous alloying which is known to occur at low temperature in man-made nanoclusters.

This new discovery, made in rocks from western Canada, is likely to be of larger significance because it suggests that there exists a process for forming metallurgically significant mineral deposits consisting of enrichments of a type of ore mineral that is heretofore unknown. In this instance, the process by which these nanoclusters formed is thought to have involved low temperature transport of metals and other elements in highly saline brines. The metals were carried by complexes that are stable in oxidized, somewhat acidic brines and were deposited in metastable form as nanoclusters when the metal complexes became destabilized upon reduction by microbial reduction reactions, or by another process. This mechanism is similar to known processes for the formation of gold colloids in a laboratory whereby a gold chloride solution is reduced by addition of an organic reductant such as formaldehyde. resulting in the formation of a gold colloid from the now-destabilized gold chloride solution. The gold colloids produced by this reaction are metastable with respect to macrocrystalline gold, but may persist for some time due to lack of sufficient thermal energy or time to overcome kinetic barriers to their recrystallization as macrocrystalline gold.

The essential elements of this natural process are believed to be: i) the existence of a fluid capable of dissolving and carrying the elements of value; ii) reaction of this fluid with rocks enriched in elements of value resulting in the production of complexes in the fluid that contain these elements; iii) movement of the fluid and the entrained element-bearing complexes through the geological environment until; iv) the fluid undergoes a change in its extensive or intensive properties such that the element-bearing complexes are destabilized under conditions that are either too low in temperature or too rapid in time for stable macrocrystalline solids to form, with the result being the formation of metastable nanocluster products.

These four conditions may not only apply at low temperatures and in highly saline, oxidized and mildly acidic brines such as those described in the selected areas in western Canada. Such conditions of metastable precipitation of nanoclusters may be expected whenever a geological process occurs at a time scale incompatible with the formation of stable equilibrium products. Logically then, many such processes could be envisaged to occur in low temperature geological environments, particularly sedimentary environments where there is insufficient thermal energy to permit crystallization of macrocrystalline solids. Equally, however, the formation of metastable nanoclusters may also be expected under circumstances of elevated temperature where a fluid is cooled at rates exceeding the rates of formation of the stable macrocrystalline solid. That is, any element of the periodic table may form a natural nanocluster if that element is present in a fluid that undergoes a rapid change in conditions such that the element is no longer stable within the fluid. It is therefore an aspect of this invention that monatomic or polyatomic nanoclusters composed of any element or elements of the periodic table in any proportion are included in this invention. More specifically, the nanoclusters of the naturally occurring nanoclusters comprise one or more elements selected from:

a) the group consisting of Li, Na, K, Rb, Cs and Fr, in combination with any other elements;

b) the group consisting of Be, Mg, Ca, Sr, Ba and Ra, in combination with any other elements;

c) the group consisting of precious metals such as Au and Ag, and the platinum group metals (PGM's) Ru, Os, Rh, Ir, Pd and Pt, in combination with any other elements;

d) non-precious transition metal elements selected from the group consisting of Sc, Y, Ti, Zr, Hf, V, Nb, Ta, Cr, Mo, W, Mn, Tc, Re, Fe, Co, Ni, Cu, Zn, Cd and Hg, in combination with any other elements;

e) metals or metalloid elements selected from the group consisting of B, Al, Ga, In, Tl, Si, Ge, Sn, Pb, As, Sb, Bi, Te and Po, in combination with any other elements;

f) non-metallic elements selected from the group consisting of C, N, P, O, S and Se, in combination with any other elements;

g) halogen elements selected from the group consisting of F, Cl, Br, I and At, in combination with any other elements; and h) rare earth elements selected from the group consisting of La, Ce, Pr, Nd, Pm, Sm, Eu, Gd, Tb, Dy, Ho, Er, Tm, Yb, Lu, Ac, Th, Pa, U and Pu, in combination with any other elements.

The present invention relates to this newly discovered information on the natural occurrence of nanoclusters and provides a method for their recovery. The recovery of nanoclusters is dictated by their chemical and physical characteristics, which vary with particle size and the nature of the source materials within which they are contained. Nanoclusters occur as discrete nanoclusters, as nanocluster colloids, and as nanocluster gels. They may be monatomic (composed of one element only) or polyatomic (composed of more than one element). The invention includes a process for the recovery of natural nanoclusters from solid, liquid or gaseous source materials where the nanoclusters may occur in any of these forms.

In accordance with the invention, nanocluster source materials are handled in a manner different from that practiced by conventional metallurgy. This is due to the distinctive properties of nanoclusters, which behave largely according to colloidal theory. Under aqueous conditions nanoclusters may enter into a colloidal solution and they may not necessarily dissolve to form ionic species; that is, they form a separate or discontinuous colloid phase within a continuous aqueous phase. Further, the properties of colloid systems imply that dilute solutions at lower temperatures rather than concentrated solutions at higher temperatures, are preferred conditions for the extraction of nanoclusters and formation of a nanocluster colloid solution. Likewise, because the desiccation of a nanocluster colloid may lead to the formation of a nanocluster gel, a process that may not be easily reversed, it is desirable that the nanocluster source material be prevented from drying prior to processing.

The present invention provides a process for the recovery of nanoclusters from solid, liquid or gaseous source materials which contain naturally-occurring nanoclusters as discrete nanoclusters, as nanocluster colloids and as nanocluster gels. One aspect of this invention is the discovery that nanoclusters occur in nature and are not solely a product of human manufacturing processes. FIG. 1 is a TEM photograph showing, for what is believed to be the first time, natural nanoclusters adsorbed to a mineral host substrate in a solid rock source material. In this image the copper nanoclusters are the small, medium to dark gray, circular to oval shaped particles. The copper nanoclusters vary from about 2 to 10 nanometers in diameter, with an average size of about 5 nanometers. The copper nanoclusters occur within a matrix of silicate and carbonate minerals which form the larger, light to medium gray crystalline matrix. The large, white to lightly shaded areas are void spaces, or pores, which form part of the permeable network of the rock. This sample is from 72.40–73.50 meters depth in drill hole BM98-4 (11-7-96-10W4) drilled at location: NTS 74 E/5, UTM zone 12, 6352852 N, 462781 E (NAD 27). The TEM image was taken under the direction of Mr. Glen De Paoli by Manfred Herford at the Microscopy and Imaging Facility of the Faculty of Medicine, University of Calgary.

Figure 2:
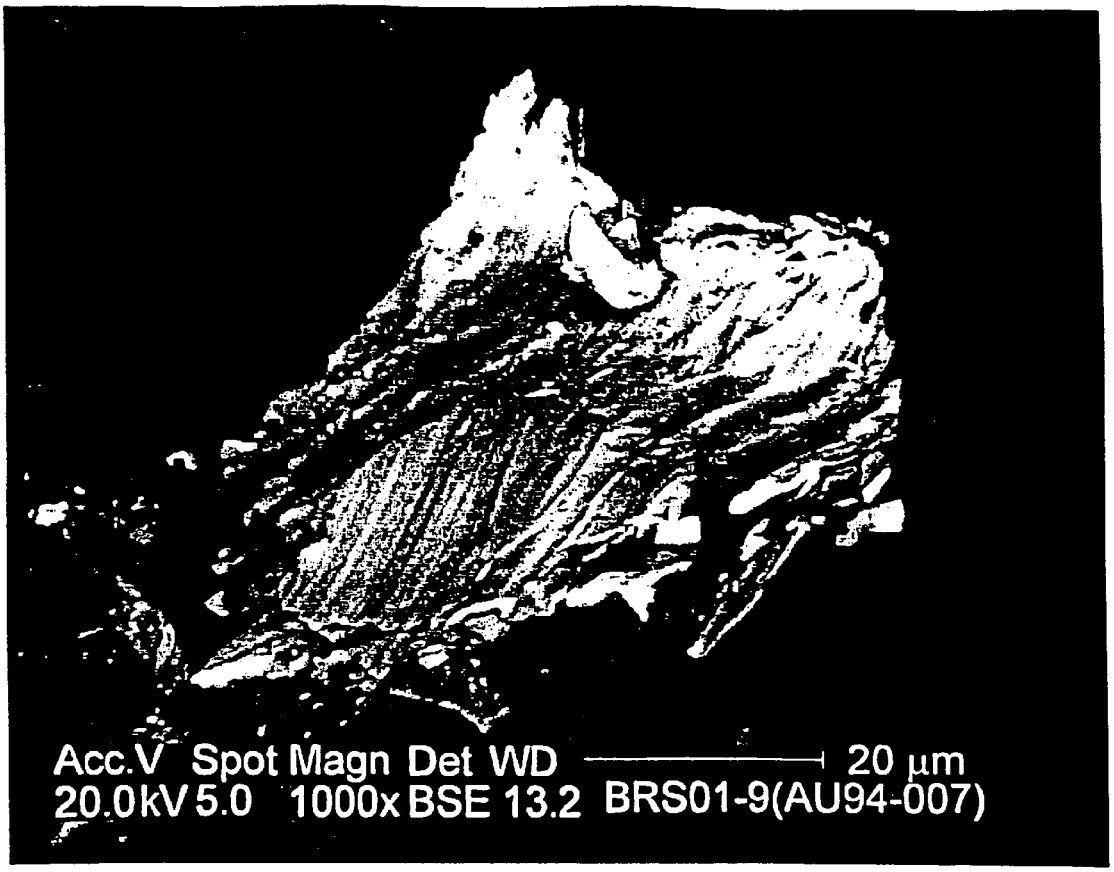
FIG. 2 is a SEM image of a naturally occurring platinum nanocluster gel in rock from northeastern Alberta, Canada.

FIG. 2 is a scanning electron microscope photograph showing a platinum nanocluster gel contained within a solid rock source material. This image was taken using the backscattered electron detection mode of the SEM which records the platinum as the brightest phase due to its high density. The darker background is primarily silica which occurs both as rounded quartz sand grains seen near the bottom of the photo and as microcrystalline quartz. The platinum grain is about 80×40 micrometers in size and is observed to occlude intergranular porosity between the rounded sand grains. The freshly broken platinum surface exhibits a conchoidal fracture typical of glasses and other amorphous substances and shows no evidence of the hackly fracture that is diagnostic of fractured metals. This surface rock sample is Cretaceous age McMurray Formation sandstone (local name "Beaver River sandstone"), sample number AU94-007, collected by H. J. Abercrombie from the location: NTS 74 E/4, UTM zone 12, 6334759 N, 464251 E (NAD 27). The SEM image was taken by B. W. B. Tsang at the SEM laboratory of the Geological Survey of Canada, Calgary.

Accordingly, one preferred embodiment of this invention provides a process for recovering nanocluster concentrates from solid, liquid or gaseous nanocluster source materials where the nanoclusters occur as colloids, as dispersed nanoclusters adsorbed to a host substrate, or as nanocluster gels. This preferred embodiment of the invention further includes a process for producing macrocrystalline solids from the recovered nanocluster concentrate. The nanocluster recovery process comprises two parts: i) pretreatment and, ii) nanocluster colloid processing. Pretreatment produces an aqueous nanocluster slurry from solid, liquid or gaseous nanocluster source materials. Nanocluster colloid processing produces a nanocluster concentrate from the aqueous nanocluster slurry. The relations between these aspects of the invention are illustrated diagrammatically in FIG. 3. A further aspect of the invention involves the production of macrocrystalline solids from the nanocluster concentrate.

Figure 3:
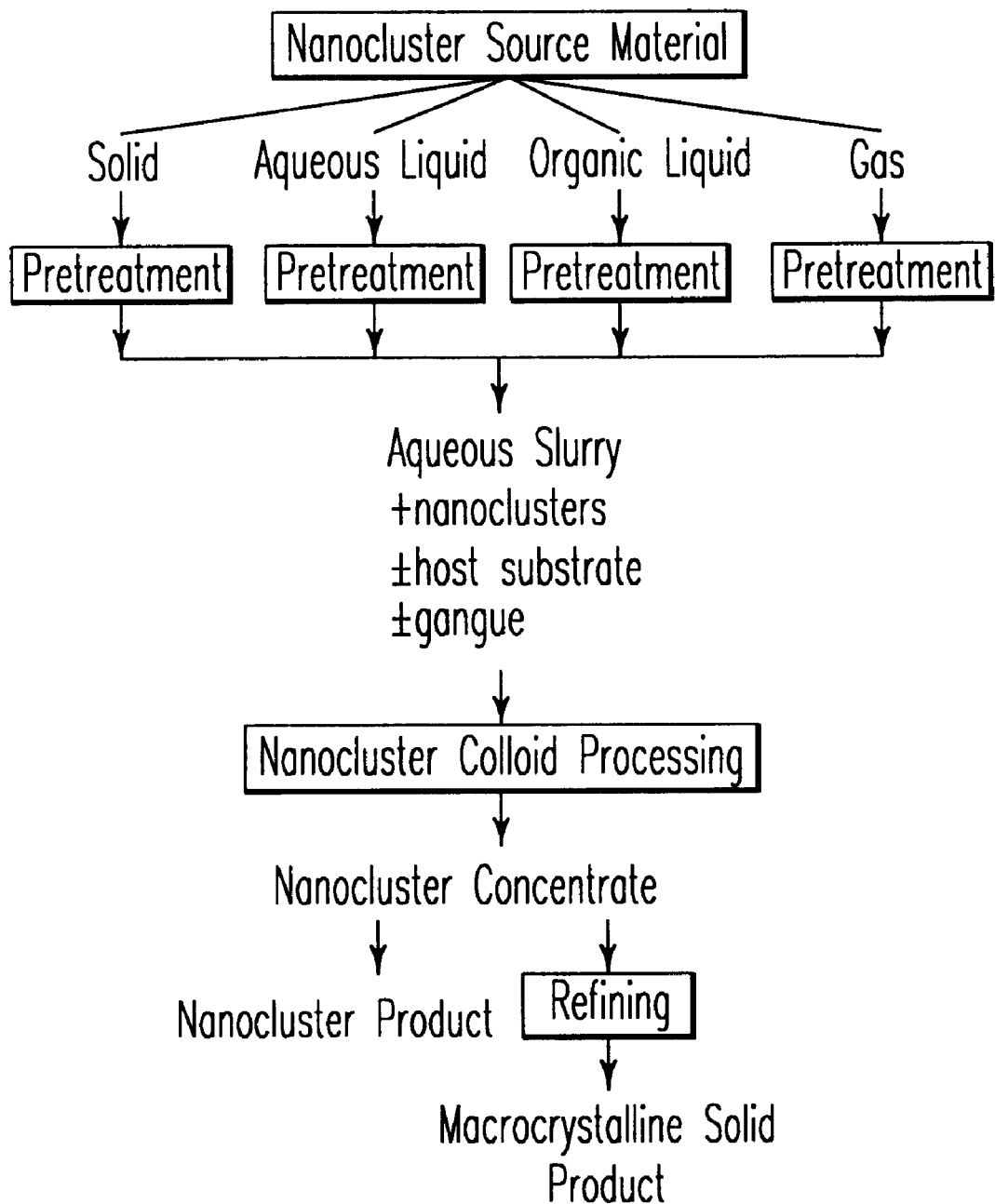
FIG. 3 is a schematic flowsheet of some of the various embodiments of the invention.

FIG. 3 illustrates various aspects of this invention. The invention commences with a source material that is demonstrated to contain nanoclusters. This nanocluster-bearing source material is pretreated in such a manner as to form an aqueous nanocluster slurry comprising nanoclusters with or without host substrate and with or without gangue. The pretreated aqueous nanocluster slurry is subsequently advanced to nanocluster colloid processing where nanocluster colloids are separated and recovered from accompanying depleted host substrate and gangue. The final product is a nanocluster concentrate which may be further refined to produce macrocrystalline solids, if desired.

The type of pretreatment used differs depending on the type of source material being processed. Included in the scope of the present invention are pre-treatments for solid, aqueous liquid, organic liquid and gaseous nanocluster source materials. Each of these source material types may be present in a single mixed type source material and such mixtures of the various source material types are also included within this invention. Processing of each source material type or of a mixture of multiple source material types will depend upon the proportions of the various source material types and on the nature and complexity of the mixture. The preferred embodiment anticipates solid-aqueous liquid and solid-organic liquid-aqueous liquid source material mixtures, however mixtures of solid, liquid or gaseous source materials in any proportions are within this invention.

The production of an aqueous nanocluster colloid solution is carried out in various ways depending on the type of source material and the form of the nanoclusters they contain. Nanoclusters may be directly recoverable from liquid nanocluster-bearing source materials. In general, however, an aqueous nanocluster slurry is prepared from the nanocluster source material and this slurry is conditioned and treated to produce an aqueous nanocluster colloid solution from which the nanoclusters are recovered in the form of a nanocluster concentrate.

One aspect of a preferred embodiment of the invention is directed at the pre-treatment of solid nanocluster-bearing source materials. Solid nanocluster-bearing source materials comprise natural rocks and other inorganic and organic solids including but not restricted to soils, unconsolidated sediments, solid bitumens, coals, peats, trees and plants. Further, solid nanocluster-bearing source materials additionally comprise any solid, organic or inorganic material that has been treated by any industrial process including but not restricted to mining, excavating, harvesting, combusting and industrial processing. Further still, the solid nanocluster-bearing source material may be a by-product or waste component of an industrial process including by way of example, but not restricted to: tailings or waste rock from mining and mineral beneficiation operations, fly ash from combustion of coals, coke from processing of liquid or solid organic material, and the residues of industrial processing of trees and plants.

A flowsheet illustrating this embodiment is shown in FIG. 4A. In this embodiment, pretreatment of the solid nanocluster-bearing source material desirably includes maintaining the source material in a hydrated state by isolating the solid source material from the atmosphere and/or adding water and thereby preventing it from drying prior to processing. The damp solid source material is crushed and then mixed with water prior to milling to form an aqueous nanocluster slurry. Preferably, the slurry is 10–50 wt % solids, more preferably 20–50 wt % solids, most preferably 20–33 wt % solids. Alternatively, it may be dry-milled prior to slurrying with water, preferably to achieve a particle size of 100% at less than 10 mesh. A solid or liquid gel hydration reagent or a peptizing reagent may be added during milling. Addition of such a solid or liquid gel hydration reagent or peptizing reagent may be necessary when the nanoclusters present in the sample are determined to contain nanocluster gels by SEM or TEM examination. Gel hydration and peptizing reagents are selected from the group including hydrochloric and nitric acids, organic acids including acetic and humic acids, and alkali bases and salts. The addition of gel hydration/peptizing reagents during pretreatment is indicated where it can be shown operationally to improve nanocluster recovery. The amount of gel hydration reagent added prior to milling is preferably from 0.1 to 20 wt % (based on amount of nanocluster bearing source material), more preferably from 1 to 10 wt %. Wet milling can also be used. The milling process is performed to achieve a particle size of 100% of particles at less than or equal to 100 mesh, more preferably with at least 80% of particles at 250 mesh or smaller. Once optimal particle size reduction has been achieved, water is added to the milled solids and the aqueous slurry is advanced to nanocluster colloid processing.

An aspect of processing of solid nanocluster-bearing source materials, is that it is desirable that the source materials be reduced to an extremely fine particle size, preferably having particle size less than 100 mesh, most preferably having at least 80% of particles with particle size of 250 mesh or smaller. The small size of nanoclusters precludes their liberation by milling, except as they may be exposed at the surface of a ground particle. However, a process in accordance with the invention involves colloid regeneration and dispersal to solution so that the nanocluster is desorbed from the host substrate and enters into a colloidal solution within the natural porosity of the source material. For this reason, crushing and fine milling of a solid nano-cluster source material is desirable to enhance intimate contact of the nanoclusters with solutions and reagents, but it is not done for the purposes of particle liberation.

Another aspect of the invention is directed at the pretreatment of aqueous liquid nanocluster source materials. A flowsheet illustrating this embodiment is shown in FIG. 4B. Aqueous liquid source materials may include both natural waters and waters obtained from in situ production facilities. The aqueous liquid may be natural in origin or may be a water or a condensate derived from fluids injected into a solid material for the purposes of recovering natural nanoclusters or other materials. In other words, the nanoclusters may be a by-product of the recovery of other materials or they may be the product sought in an in situ recovery scheme. As with solids, it is desirable that the aqueous liquid source material be prevented from drying.

Many such aqueous liquid nanocluster source materials should need little or no pretreatment and may be presented as-is to subsequent nanocluster colloid processing as shown in FIG. 4B. This aspect of the invention is appropriate when the composition of the aqueous liquid is compatible with the latter process. However, if the composition of the aqueous liquid nanocluster source material is incompatible with the parameters of nanocluster colloid processing, the nanoclusters and any host substrate or gangue may be extracted and reslurried with water. As an example, such a situation might arise if the nanoclusters are present as a heterocoagulated colloidal fraction in a highly saline material. The nanoclusters in that case could be separated from the highly saline material by a process such as adsorption on activated carbon, then reslurrying in fresh water for further processing. The aqueous slurry preferably contains the same solids content discussed above in connection with the use of solid source materials. In this embodiment of the pretreatment process, the nanoclusters and any host substrate and gangue are separated from the aqueous liquid by gravity settling, centrifugation, filtration, dialysis or a combination of these or other processes known to those knowledgeable in the art. Coagulants, flocculants and heating of the aqueous nanocluster solution may also be utilized to promote phase separation. The separated nanoclusters, host substrate and gangue are then reslurried by mixing with water and advanced to nanocluster colloid processing.

Another aspect of the invention is directed at the pretreatment of organic liquid nanocluster-bearing source materials and this is illustrated in FIG. 4C. In general, any solid or liquid nanocluster-bearing source material containing even a small amount of organic liquids will desirably be considered to be and treated as an organic liquid nanocluster-bearing source material. Such materials may be oils, bitumens, condensates, or other hydrocarbon liquids which may contain both solid and aqueous liquid nanocluster-bearing source material components. Further, the organic liquid source material may be an oil sand, a bituminous sand, an oil shale or a bituminous shale material which has been partly processed during hydrocarbon recovery. Further still, the organic liquid source material may be a residual component of an oil shale or oil sands hydrocarbon recovery process and may comprise waste material or tailings of such a process.

In the embodiment shown in FIG. 4C, pretreatment of the organic liquid source material begins with an initial phase separation involving removing any water contained within the source material. Phase separation may be accomplished by gravity settling or centrifugation and may be further effected by application of surfactants, heat and steam. The separated water may itself may contain residual nanoclusters and, if so, may be treated as an aqueous nanocluster source material or it may be recycled. The separated organic liquid with entrained, nanocluster bearing components is then further separated into barren organic liquid and a solids component comprising nanoclusters and any host substrate or gangue. This second separation is preferably effected by adding a soluble solvent or diluent and optionally a surfactant to the organic liquid and heating to cause gravity segregation of the solids. Centrifugation and filtration may be employed to improve the separation of organic liquid and solid, nanocluster bearing components. The separated nanoclusters with any host substrate and gangue are then slurried with water and advanced to nanocluster colloid processing. It may be necessary to condition the aqueous nanocluster slurry with oxidizing reagents to remove residual organics. The resulting aqueous slurry preferably has the same solids content as discussed above in connection with solid source materials.

Another aspect of the invention is directed at the pretreatment of gaseous nanocluster source materials. Such materials are believed to be uncommon, but may be expected in situations where a natural gaseous substance is cooled rapidly such that a portion of the gases condense to form nanoclusters, or from incinerator facilities where metal containing compositions are being incinerated, such as silver recovery facilities in the X-ray film processing industry. Suitable conditions may be encountered in geothermal production facilities, in deep oilfield production facilities and in the natural environment at locations such as geysers or volcanic fields where superheated gases carrying volatile compounds emanate and rapidly cool. Similar conclusions were reached by Tredoux and Lindsay (1990) with respect to platinum group element deposition from volcanic aerosols.

In this embodiment, shown in FIG. 4D, the gaseous nanocluster source material is pretreated by passing the gaseous stream through a condenser and subsequently scrubbing the gas and entrained material in one or more scrubbers. The scrubbers capture the nanoclusters and any host substrate in an aqueous liquid, in effect transferring the nanoclusters from a gaseous medium to an aqueous medium. The aqueous scrubber solutions are preferably made acidic or basic by addition of 0.1 to 1 wt % of hydrochloric acid, sulfuric acid or aqua regia, or from 0.1 to 1 wt % of alkali sulfide or borohydride in basic solution (preferably 1–5 wt % aqueous alkali hydroxide), respectively. If required, the aqueous scrubber solution may be further treated by separating the nanocluster component by phase separation, using methods including but not limited to gravity settling, centrifugation, filtration or other methods known to those skilled in the art. Coagulants, flocculants and heat may further be employed to effect such separation, if desired. The recovered nanocluster containing component is reslurried with water and advanced to nanocluster colloid processing.

In these preferred embodiments, pretreatment of solid, aqueous or organic liquid, and gaseous nanocluster-bearing source materials produces an aqueous nanocluster slurry comprising one or more of the components including water, nanoclusters, host substrate, and gangue. Once formed, the aqueous nanocluster slurry is advanced to nanocluster colloid processing. In nanocluster colloid processing it may be advantageous to condition the aqueous slurry as a first step. This conditioning is normally done to remove any barriers to contacting the slurry with subsequent reagents for gel hydration, peptization, dispersal or desorption. For example, the nanoclusters (with or without host substrate) may be covered with an inorganic or organic material which must be removed prior to subsequent processing. Slurry conditioning may include acid or caustic digest or treatment by oxidizing reagents. Addition of aqueous inorganic acid reagents including hydrochloric, nitric and sulfuric acids and their mixtures dissolves carbonate minerals, sulphate minerals or other acid sensitive material, thereby improving access of subsequent reagents and treatments to the dispersed nanoclusters. Such acidic reagents are preferably added in an amount sufficient to lower the pH of the slurry to pH 2 or less, more preferably pH 1 or less. Addition of caustic reagents selected from the group of alkali and ammonium hydroxides may contribute in a similar fashion, but in addition will remove organic material, as well as silica and other base soluble materials. The addition of basic (caustic) reagents is preferably in an amount sufficient to raise the pH to a level of pH 9 or higher, more preferably to pH 10 or greater. The use of chemical oxidation agents, such as alkali hypochlorites, peroxides or ozone, may be desirable to remove solid or liquid organic materials or sulphide coatings that might be present in the aqueous nanocluster slurry. The use of oxidants is preferably in an amount sufficient to provide an oxygen reduction potential of the slurry of +600 mV or greater, more preferably +800 mV or greater. Slurry conditioning is optional and the choice to carry out such conditioning is normally made upon demonstration of improved nanocluster recovery.

Following slurry conditioning, the nanoclusters and any host substrate or gangue may optionally be separated from the aqueous solution by contacting the aqueous slurry with a coagulant or flocculant to cause the solids fraction to settle whereupon it is recovered by filtration or by centrifugation and decantation. Suitable coagulants or flocculants are those known in the art, including, but not limited to, soluble aluminum salts or polyaluminum chloride. The coagulants or flocculents are used in an amount sufficient to remove >95% of the colloidal particles from solution, more preferably in an amount of from 0.001 to 0.1 wt % (10–1000 ppm) based on total amount of solution. The recovered material is then suspended in clean or recycled water to form an aqueous nanocluster slurry.

Depending on the form of the nanoclusters present, the aqueous nanocluster slurry may be further treated to effect gel hydration and colloid peptization. If the nanoclusters are present as nanocluster gels, it is advantageous to first carry out gel hydration whereby the nanocluster gels are reacted with gel hydration reagents including hydrochloric and nitric acids, or organic acids including acetic and humic acids, to form a hydrated gel. The acids are preferably added as concentrated acids in an amount from 0.1 to 10 wt %, based on total slurry, more preferably from 1 to 3 wt %. If the source material originally contains carbonates, additional acid may be neccessary to neutralize and destroy the carbonates. This may not in itself be sufficient to form nanocluster colloids, which may require the addition of a simple electrolyte selected from the group of alkali bases and salts, and their mixtures to peptize the hydrated nanocluster and form a nanocluster colloid. The alkali bases and salts are preferably used in an amount of 0.1 to 20 wt % of slurry, more preferably from 1 to 10 wt %. In this colloid regeneration step the aqueous slurry may be heated, pressurized and agitated to promote gel hydration and peptization of nanoclusters. This may be done in a vessel such as a stirred pressure autoclave where it is advantageous to carry out both gel hydration and nanocluster peptization simultaneously. The heating is preferably from 25 to 120° C. at a pressure from 1 to 10 atmospheres, preferably using a combination of temperature and pressure sufficient to effect complete peptization. The time of heating is that which is sufficient to effect peptization, preferably from 0.5 h to 3 days, more preferably from 1 to 8 h. As an alternative or adjunct, agitation, such as by ultrasonic processing, stirring or rotary mixing may be employed in open or closed vessels to promote colloid regeneration.

The release of regenerated nanocluster colloids from solid or liquid surfaces in the aqueous nanocluster slurry to the nanocluster colloid solution is accomplished through processes involving dilution and dispersion of the host substrate coupled with the addition of reagents to cause the now-formed nanocluster colloids to be desorbed from the host substrate. The aqueous nanocluster slurry is subsequently cooled and diluted with water and contacted with dispersants to promote complete dispersion of the host substrate within the aqueous slurry. Full dispersion of the nanoclusters and any host substrate or gangue through the diluted slurry is desirable to minimize the chance that a critical level of nanocluster colloids could be induced to enter into solution, thereby causing flocculation of the nanocluster colloids. Dispersants are chosen for their effectiveness, preferably from the group including ammonium and alkali hydroxides, phosphates, polyphosphates, silicates, carbonates and polyelectrolytes. Dispersants are preferably added in an amount of from 0.001 to 0.1 wt % (10–1000 ppm) based on total slurry. The dilutions is performed to give approximately 0.5 to 40 wt % solids, preferably 15–30 wt % solids. The dispersion step is preferably performed at cool to ambient temperatures, more preferably from 10 to 30° C., most preferably from 15 to 25° C.

Following dispersion of the aqueous slurry, the pH and chemical composition of the diluted aqueous nanocluster slurry are modified to cause the nanocluster colloids to be desorbed from the host substrate to form a mixture comprising aqueous nanocluster colloid solution, depleted host substrate and gangue. Desorption is controlled by the surface charge of the host substrate and of the nanoclusters themselves. Desorption of nanoclusters from the host substrate is controlled by modifying the sorptive forces acting to keep the nanocluster attached to the host substrate. Where the nanocluster is negatively charged it tends to be preferentially sorbed to sorption surfaces with a positive surface potential. Positively charged nanoclusters tend to be sorbed on sorption surfaces with a negative surface potential. In systems involving charged particles desorption is controlled by adjusting the composition of the solution.

The relation between the surface potential of the substrate and the composition of the fluid is reflected in the point of zero charge (PZC) of the system. The PZC is the point at which the surface potential of the substrate is zero and hence positive and negative ions or colloids are adsorbed equally. The PZC commonly is expressed in terms of pH, but may also be expressed in terms of the concentration of any potential-determining ion. At pH values greater than the PZC, the surface potential of the substrate becomes negative and adsorption or retention of positively charged ions or colloids is favored. At pH values lower than the PZC the surface potential of the substrate is positive and adsorption or retention of negatively charged ions or colloids is favored. Therefore, the potential of a sorption surface can be modified by changing the pH of the system. A positively charged surface may be rendered effectively negative by increasing pH thereby causing desorption of negatively charged nanocluster colloids. Likewise, desorption of positively charged nanoclusters can be effected by decreasing pH to a point below the PZC.

Preferably, the pH is adjusted to pass through the PZC and continue until the pH value is at least 2 units away from the PZC, more preferably at least 2.5 units away, most preferably at least 3 pH units away. For example, if the slurry has a pH of 8, containing a negatively charged substrate having PZC of 6.5 and a positively charged nanocluster, the slurry is modified by addition of acid (hydronium ion) to lower the pH to 4.5 or lower, preferably to 4 or lower, most preferably to 3.5 or lower, thereby desorbing the nanocluster from the substrate, which now has a positively charged surface.

The desorption step is preferably performed using acidic or basic reagents having concentrations from 0.1 to 20 wt %. The amount of acidic or basic solution added is that which is sufficient to change the pH of the nanocluster slurry to at least 2 pH units beyond the PZC of the host substrate, preferably, from 0.001 to 25 wt % (10–25,000 ppm), more preferably from 0.01 to 10 wt %, based on total nanocluster slurry.

In the preferred embodiments of the invention, nanoclusters of whatever charge and size are caused to desorb from their host substrate by modifying pH and the chemical composition of the aqueous slurry. Desorption reagents may be selected from any pH increasing or lowering compounds, preferably from the group including alkali or ammonium hydroxides where an increase in pH is sought, or from the group including inorganic or organic acids including hydrochloric, nitric, sulfuric and acetic acids where a decrease in pH is sought. Alkali and ammonium salts including chlorides, sulphates, thiosulphates and peroxydisulphates may be added to the aqueous slurry to promote stabilization of the nanocluster colloids. These may be added in amounts of from 0 to 20 wt % (based on total aqueous slurry). The products of desorption are an aqueous nanocluster colloid solution and depleted solids including host substrate and gangue, if present. The desorption reagents are used neat (such as solid potassium hydroxide pellets) or as aqueous solutions having from 0.0001 to 25 wt % of desorption reagent, more preferably from 0.1 to 20 wt %, most preferably from 0.1 to 10 wt %.

In the preferred embodiments of the invention the aqueous nanocluster colloid solution is separated from the depleted host substrate and gangue components. The aqueous nanocluster colloid solution may be separated using any of a variety of separation techniques, including but not limited to gravity settling, centrifugation, filtration and combinations thereof or other methods known to those skilled in the art, and the colloidal nanocluster solution is decanted from the residue. A nanocluster concentrate is formed by contacting the nanocluster colloid solution with sorptive or ion exchange media, either by adding these to, and subsequently recovering them from the solution, or by passing the solution through a column loaded with such media, thereby forming a nanocluster concentrate. Sorptive and ion exchange media are preferably selected from the group including activated carbon and ion exchange resins. A nanocluster concentrate may alternatively be formed by treating the aqueous nanocluster colloid solution with coagulants or flocculants and by using centrifugation or filtration to recover a nanocluster concentrate.

In another aspect of the invention, macrocrystalline solids are produced from the nanocluster concentrate. Using methods known to those skilled in the arts of metallurgy and refining, the nanocluster concentrate may be dissolved and processed to produce macrocrystalline solids. Alternatively, it may be subjected to treatment at elevated temperature and/or pressure under atmospheres of controlled composition to produce macrocrystalline solids, or it may be refined using fluxing and collection agents to produce macrocrystalline solids.

The nanocluster concentrate may further be dissolved by inorganic acids including hydrochloric acid, nitric acid, sulfuric acid and their mixtures, and the dissolved ions recovered by any combination of adsorption, ion exchange, precipitation, electrowinning and/or cementation. The nanocluster concentrate may additionally be treated with an oxidizing agent including alkali peroxides, nitrates, chlorates, perchlorates, persulphates, and their respective acids, or ozone. The nanocluster concentrate may be further treated with a reducing agent selected from the group of alkali borohydrates, alkali sulphides, and organic acids. It may also be subjected to a combination of heat and pressure treatment under controlled atmospheres rendered oxidizing using oxygen, sulfur dioxide or nitrous oxide gases, or reducing using hydrogen, hydrogen sulfide and hydrocarbon gases to produce a macrocrystalline solid from a nanocluster concentrate precursor.

Having generally described this invention, a further understanding can be obtained by reference to certain specific examples which are provided herein for purposes of illustration only and are not intended to be limiting unless otherwise specified.

EXAMPLES

All samples used were collected in the field and were prepared in external sample preparation facilities. The experiments were carried out at ambient pressure and were run with blanks selected or blended to be of similar bulk composition to the samples used. Nanoclusters were not recovered from the blank experiments, neither were any precious metals detected by graphite tube atomizer-atomic absorption (GTA-AA) analyses of process solutions from the blanks.

The solid nanocluster-bearing source material samples were pretreated by crushing, blending and dry milling. Crushing involved breaking the rock into fist size pieces of rock and crushing these to less than 10 mesh using a jaw crusher. Subsequently the crushed samples were blended and split by riffle splitter, and then dry-milled using a plate pulverizer. Nominal particle size used in all experiments was 100% less than 100 mesh and 80% less than 250 mesh. Gel hydration agents were not added during processing.

The samples used include both bulk samples collected from surface trenches and drill core samples. Sample HAR98-001 was a sideritized nodular limestone collected from a surface trench located at: UTM Zone 12, 463998 E, 6332496 N (NAD 27). Sample BJ98-008 was partly sideritized nodular limestone collected from a surface trench located at: UTM Zone 12, 464143 E, 6334562 N (NAD 27). Sample GDP99-5 was crystalline dolostone drill core sample taken from 272.50 to 273.50 meters depth in drill hole ATH 94-01 located at: UTM Zone 12, 463958 E, 6342293 N (NAD 27).

All chemical analyses of solutions were performed on a Varian Spectra 55 atomic absorption spectrometer equipped with a model GTA 100 graphite tube atomizer by Mr. Scott R. Rose. All analyses were corrected for background using deuterium arc background correction. Standards used were obtained from Alfa Aesar as 1000 ppm in Au, Pd and Pt solutions. Chemicals used in the experiments were all certified ACS grade reagents supplied by Fisher Scientific. Water was single-distilled from mains feedwater using a Consolidated Stills and Sterilizers Ltd. water distillation system, model number E-1H/W.

Example 1

Recovery of Copper Nanoclusters

Figure 6:
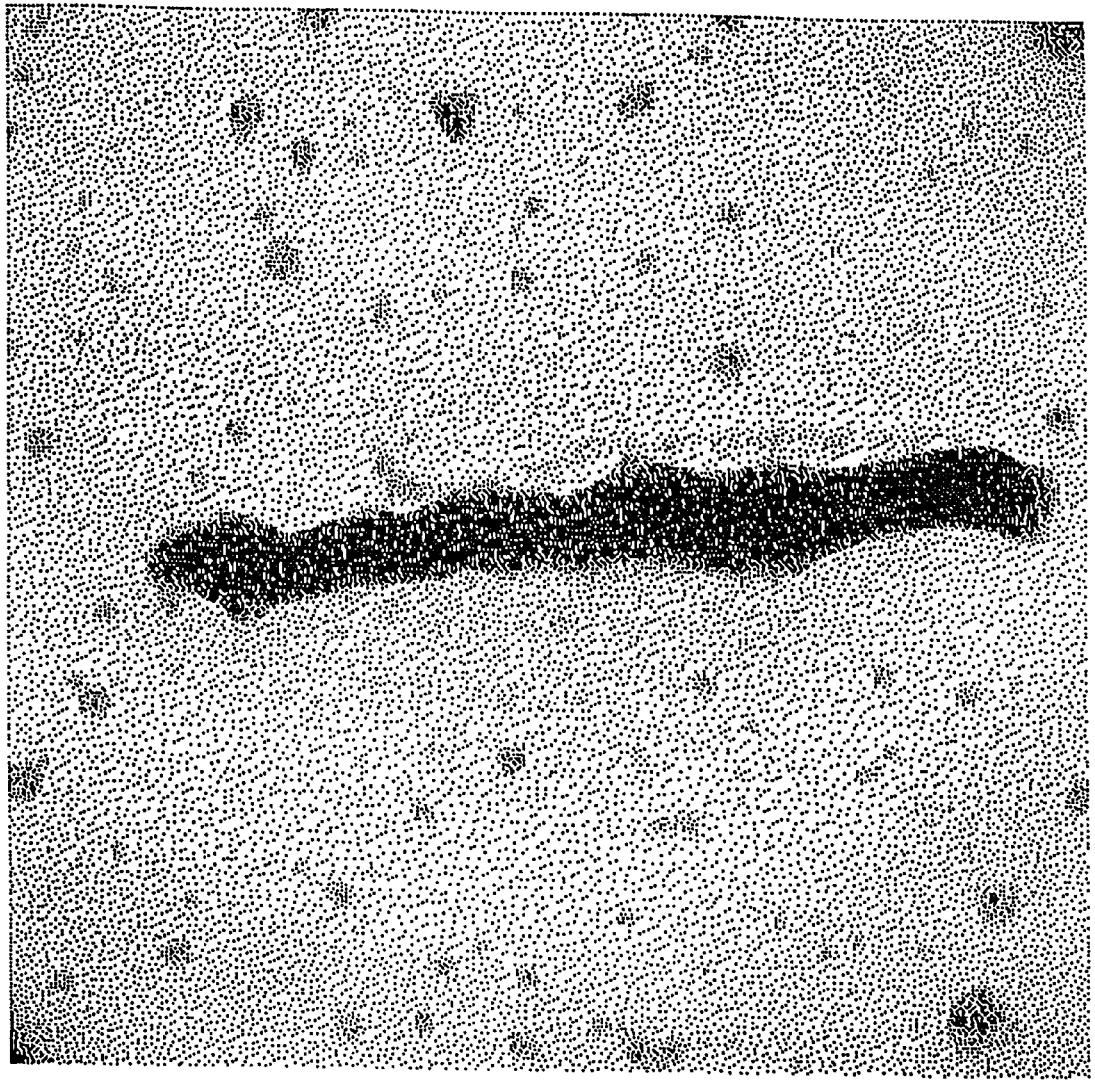
FIG. 6 is a TEM photograph of dispersed flocs from a nanocluster concentrate.

A bright pink solution indicative of the presence of copper nanocluster colloids was produced in this example; the presence of natural nanoclusters was confirmed by TEM examination shown in FIG. 6, which is a TEM image of floc particles from a nanocluster colloid solution produced from sample BJ908-008. Pretreatment of the sample involved the preparation of an aqueous nanocluster slurry by crushing and milling as described above, then mixing with water to form a slurry. The aqueous slurry was prepared by measuring a 30.0 g portion of bulk sample BJ98-008 into a 400 ml beaker and adding 70 ml of distilled water. Prior SEM examination of this sample yielded only one nanocluster gel particle and therefore the sample was not subjected to gel hydration or peptization.

A total of 14.0 g of potassium hydroxide was added to the solution to condition the aqueous nanocluster slurry and 10.0 g of ammonium peroxydisulphate was added to stabilize the nanocluster colloids. The mixture was stirred and heated to 70° C. and maintained at this temperature for a period of two hours. After approximately 1.5 hours of heating and stirring the solution began to take on a pinkish hue indicative of the formation of a copper nanocluster colloid solution and at two hours the heating and stirring was stopped. The sample solution was left to cool settle until it reached room temperature. The copper nanocluster colloid solution was separated from the solid host substrate by processing in a centrifuge for 10 minutes at 2,000 rpm. The pink nanocluster colloid solution was stable during the centrifugation, but the nanocluster-bearing source material solids were compacted, allowing the pink solution to be decanted. Reprocessing of the solids using fresh solution yielded additional pink nanocluster colloid solution.

Attempts were made to characterize the chemical composition of the copper nanocluster colloid solution by both flame AA and GTA-AA. Both approaches proved unsuccessful and were abandoned due to high interferences from the high amount of reagents used. The decanted pink solution was prepared for TEM analysis by drying. A small portion of the dried solution was powdered, mixed with water and pipetted onto a TEM grid mount, where the water was allowed to evaporate. The grid mounted sample was analyzed by TEM at the University of Calgary and at the Materials Technology Laboratory, CANMET, Ottawa, where the identification of the copper nanoclusters in the nanocluster colloid solution was confirmed by energy dispersive x-ray analysis. The images show that copper nanocluster colloids compose up to about one-half of the nanocluster concentrate.

Example 2

Gold Recovery in Copper Nanoclusters

To determine the gold content of solid copper nanocluster-bearing source material, a variation of the previous experiment was carried out. The objective was to produce a pink coloured, copper nanocluster colloid solution which could then be diluted and analyzed for gold by GTA-AA. A 30.0 g crushed and milled portion of sample BJ98-008 was weighed into a 400 ml beaker and 100 ml of distilled water made up to 20% by weight potassium hydroxide was added to form the conditioned aqueous nanocluster slurry. A 10.0 g portion of ammonium peroxydisulphate was added to the aqueous slurry and the sample was placed on a stirred hotplate with a magnetic stirrer. The sample was heated to 80° C. for two hours, then removed from heat and allowed to stand for another hour. A pink coloured, colloidal solution appeared over the residue and the aqueous nanocluster solution was centrifuged for 20 minutes at 2000 rpm. The pink coloured, aqueous copper nanocluster colloid solution was decanted and the residue discarded.

The pink coloured solution was prepared in a series of dilutions using distilled water. An amount sufficient to make the required dilution of the pink coloured solution was removed and transferred to a 100 ml volumetric flask. The flask was brought up to 100.0 ml with distilled water. Table 1 shows the dilutions made and the GTA-AA results for this sample; both background and peak absorbencies are reported.

TABLE 1

GTA-AA results for the diluted copper nanocluster colloid solution.

| Sample Dilution | Gold Diluted Solution (ng/g) | Mean Absorbence | Background Absorbence | Gold Calculated Head Grade (g/t) |
|---|---|---|---|---|
| 1% | 4.48 | 0.0486 | 0.1095 | 1.49 |
| 2% | 2.12 | 0.0230 | 0.1995 | .35 |
| 3% | 0.77 | 0.0083 | 0.2799 | .09 |
| 5% | 0.29 | 0.0031 | 0.4314 | .02 |
| 7% | 0.25 | 0.0027 | 0.5276 | .01 |
| 10% | 0.54 | 0.0059 | 0.7161 | .02 |

The results show that the copper nanocluster colloid solution carries gold at a minimum calculated head grade gold value of 1.49 g/t. Routine fire assay of this rock sample carried out by a commercial geochemical analysis laboratory determined the gold content of this rock to be 0.003 g/t.

Example 3

Extraction of Gold, Platinum and Palladium

Further experiments were conducted under conditions of elevated dilution to ascertain the recovery of precious metals via the nanocluster colloid solution. The extraction procedure used relied solely on desorption of discrete nanoclusters. Three different samples, BJ98-008, HAR98-001 and GDP99-005, were used. Pretreatment of these solid nanocluster-bearing source materials involved crushing to −10 mesh, dry milling to particle sizes of 100% less than 100 mesh and 80% less than 250 mesh. An aqueous nanocluster slurry was prepared by measuring 0.5 g of each sample into a 150 ml beaker and adding 100 ml of distilled water and stirring with a magnetic stirrer for 1 minute. Granulated potassium hydroxide was added to the aqueous nanocluster slurry in a quantity sufficient to bring the pH of the slurry into the range pH 11.7–11.9.

The aqueous nanocluster slurry was processed at ambient temperature (approximately 20° C.) for a period of 6 hours. For the first three hours the slurry was stirred vigorously using a magnetic stirrer; stirring was stopped for the last three hours. At the end of the 6 hour period the aqueous nanocluster slurry was stirred gently so that it could be transferred to a centrifuge container. The aqueous nanocluster slurry was centrifuged at 2100 rpm for a period of 40 minutes at which point the nanocluster colloid solution was decanted from the residual solid nanocluster-bearing source material.

Precious metals in the nanocluster colloid solution were determined by GTA-AA giving the following results:

TABLE 2

Calculated gold, palladium and platinum concentrations.

| Sample | Gold Calculated Head Grade (g/t) | Palladium Calculated Head Grade (g/t) | Platinum Calculated Head Grade (g/t) |
|---|---|---|---|
| BJ98-008 | 0.702 | 0.010 | 0.76 |
| HAR98-001 | 0.516 | 0.162 | 1.20 |
| GDP99-005 | 0.396 | 0.242 | 2.36 |

Routine fire assays for sample BJ98-008 detected 0.003 g/t Au, 0.003 g/t Pd and less than 0.005 g/t Pt. For sample HAR98-001 routine fire assay values were 0.002 g/t Au and Pd and less than 0.005 g/t Pt. High energy K x-ray analyses carried out by KX Technology Ltd, Devon, UK, detected 1.22 g/t Pt and less than 0.5 g/t Au for sample BJ98-008 and 0.83 g/t Pt and less than 0.5 g/t Au for sample HAR98-001.

Routine fire assay and Aztec K x-ray determinations of precious metals are unavailable for sample GDP99-005.

The results obtained in the above experiments demonstrate the presence of naturally occurring nanoclusters of metals, as well as the difficulty in using conventional assay techniques to determine their presence. However, by using the methods described herein, one can obtain readily measurable and usable quantities of nanocluster concentrates, which can be used as is or further processed to isolate macrocrystalline metals.

Obviously, additional modifications and variations of the present invention are possible in light of the above teachings. It is therefore to be understood that within the scope of the appended claims, the invention may be practiced otherwise than as specifically described herein.

DEPOSIT OF COMPUTER PROGRAM LISTINGS

Not Applicable

What is claimed is:

1. A process for recovering naturally occurring nanoclusters, comprising:
    providing an aqeuous nanocluster slurry from a nanocluster bearing geologic source material comprising naturally occurring nanoclusters and a geologic host substrate;
    desorbing said naturally occurring nanoclusters from said geologic host substrate using a mixture comprising water and a reagent capable of separating said naturally occurring nanoclusters from said geologic host substrate;
    separating and recovering an aqueous nanocluster colloid solution formed by the desorbing step, by one or more processes selected from the group consisting of gravity settling, centrifugation and filtration to form a separated aqueous nanocluster colloid solution; and
    treating the separated aqueous nanocluster colloid solution by one or more processes selected from the group consisting of adsorption and ion exchange to produce a nanocluster concentrate.

2. The process claimed in claim 1 where the naturally occurring nanoclusters occur adsorbed to a host substrate.

3. The process claimed in claim 1 where the naturally occurring nanoclusters occur as nanocluster colloids.

4. The process claimed in claim 1 where the naturally occurring nanoclusters occur as nanocluster gels.

5. The process claimed in claim 1 where the naturally occurring nanoclusters occur as mixtures of two or more members selected from the group consisting of nanoclusters, nanocluster colloids and nanocluster gels.

6. The process claimed in claim 1 where the nanocluster bearing source material is a solid.

7. The process claimed in claim 1 where the nanocluster bearing source material is a liquid.

8. The process claimed in claim 1 where the nanocluster bearing source material is a gas.

9. The process claimed in claim 1 where the nanocluster bearing source material is two or more members selected from the group consisting of solid, liquid and gas nanocluster bearing source materials, in any proportion thereof.

10. The process claimed in claim 1 where the naturally occurring nanoclusters comprise one or more elements selected from the group consisting of Li, Na, K, Rb, Cs and Fr, in combination with any other elements.

11. The process claimed in claim 1 where the naturally occurring nanoclusters comprise one or more elements selected from the group consisting of Be, Mg, Ca, Sr, Ba and Ra, in combination with any other elements.

12. The process claimed in claim 1 where the naturally occurring nanoclusters comprise one or more metals selected from the group consisting of Au, Ag, Ru, Os, Rh, Ir, Pd and Pt, in combination with any other elements.

13. The process claimed in claim 1, where the naturally occurring nanoclusters comprise one or more non-precious transition metal elements selected from the group consisting of Sc, Y, Ti, Zr, Hf, V, Nb, Ta, Cr, Mo, W, Mn, Re, Fe, Co, Ni, Cu, Zn, Cd and Hg, in combination with any other elements.

14. The process claimed in claim 1 where the naturally occurring nanoclusters comprise one or more metals or metalloid elements selected from the group consisting of B, Al, Ga, In, Tl, Si, Ge, Sn, Pb, As, Sb, Bi, Te and Po, in combination with any other elements.

15. The process claimed in claim 1 where the naturally occurring nanoclusters comprise one or more non-metallic elements selected from the group consisting of C, N, P, O, S and Se, in combination with any other elements.

16. The process claimed in claim 1 where the naturally occurring nanoclusters comprise one or more halogen elements selected from the group consisting of F, Cl, Br, I and At, in combination with any other elements.

17. The process claimed in claim 1, where the naturally occurring nanoclusters comprise one or more rare earth elements selected from the group consisting of La, Ce, Pr, Nd, Sm, Eu, Gd, Tb, Dy, Ho, Er, Tm, Yb, Lu, Ac, Th, Pa and U, in combination with any other elements.

18. The process claimed in claim 1 where the nanocluster bearing source material is prevented from drying by isolation from atmosphere, by addition of water, or by a combination thereof.

19. The process claimed in claim 1 where the nanocluster bearing source material is an aqueous nanocluster bearing source material.

20. The process claimed in claim 19, further comprising, after the desorbing step, recovering nanocluster colloids to form a nanocluster concentrate.

21. The process claimed in claim 20, wherein said recovering step is performed by one or more processes selected from the group consisting of gravity settling, adsorption, ion exchange, heating, coagulation, flocculation, filtration, centrifugation, electrolysis, and dialysis.

22. The process claimed in claim 20, where the desorbing step is performed by addition of one or more reagents to cause nanoclusters to be desorbed from the host substrate said reagents being selected from the group consisting of alkali and ammonium hydroxides, inorganic acids selected from the group consisting of hydrochloric, nitric and sulphuric acids, and organic acids.

23. The process claimed in claim 1, wherein the nanocluster bearing source material is a solid nanocluster bearing source material and the aqueous nanocluster slurry is provided by: reducing the solid nanocluster bearing source material particle size by crushing; mixing the crushed solid nanocluster bearing source material with water to form a slurry; wet milling the slurry to provide a particle size of the solid nanocluster bearing source material of 100 mesh or smaller.

24. The process as claimed in claim 23, wherein said particle size of the solid nanocluster bearing source material is 80% of particles of 250 mesh or smaller.

25. The process claimed in claim 23 where the crushed solid nanocluster bearing source material is dry milled prior to mixing with water.

26. The process claimed in claim 23 wherein one or more gel hydration reagents selected from the group consisting of hydrochloric and nitric acids, organic acids and alkali bases and salts are added to the slurry prior to wet milling.

27. The process claimed in claim 1, wherein the nanocluster bearing source material is an organic liquid nanocluster bearing source material and said aqueous nanocluster slurry is provided by: separating any water contained in the organic liquid nanocluster bearing source material by one or more processes selected from the group consisting of addition of a soluble organic solvent to reduce viscosity, gravity settling, filtration, centrifugation, heating and surfactant addition; and mixing the separated nanocluster bearing material with water to form an aqueous nanocluster slurry.

28. The process claimed in claim 1, wherein the nanocluster bearing source material is a gaseous nanocluster bearing source material, and said aqueous nanocluster slurry is provided by passing the gaseous nanocluster bearing source material through a condenser and one or more scrubbers such that the nanoclusters are collected in an aqueous scrubber solution.

29. The process claimed in claim 28, wherein said aqueous scrubber solution is an acidic solution made acidic by the addition of 0.1 to 1% hydrochloric acid, sulphuric acid or aqua regia.

30. The process claimed in claim 28, wherein said aqueous scrubber solution is a reducing solution made reducing by addition of 0.1 to 1% alkali sulphide or borohydride in a 1 to 5% alkali hydroxide basic solution.

31. The process claimed in claim 1 where the nanocluster bearing source material is a mixture of a liquid nanocluster bearing source material and one or more nanocluster bearing source materials selected from the group of solid and gas nanocluster bearing source materials.

32. The process claimed in claim 31 where the nanocluster bearing source material is a mixed nanocluster bearing source material, which is separated into solid, liquid and/or gas nanocluster bearing source materials and each of the resulting solid, liquid gaseous nanocluster bearing source materials are processed separately.

33. The process claimed in claim 1, where the aqueous nanocluster slurry is conditioned prior to the desorbing step by addition of one or more members selected from the group consisting of aqueous inorganic acid solutions, caustic reagents, chemical oxidizing regents and combinations thereof.

34. The process claimed in claim 1, wherein the aqueous nanocluster slurry is conditioned prior to the desorbing step by addition of one or more of: a) an aqueous inorganic acid solution selected from the group consisting of hydrochloric acid, nitric acid, sulfuric acid and mixtures thereof; b) caustic reagents selected from the group consisting of alkali and ammonium hydroxides and mixtures thereof; or c) chemical oxidizing agents selected from the group consisting of alkali hypochlorites, peroxides and ozone.

35. The process claimed in claim 34 wherein slurry solids containing the nanocluster bearing source materials are separated and recovered from the conditioned aqueous slurry by addition of a coagulant or flocculant and/or heat treatment in order to settle out the slurry solids, which are subsequently recovered by filtration or centrifugation and then mixed with water to reform the aqueous nanocluster slurry.

36. The process claimed in claim 1 wherein nanocluster gels contained in the nanocluster bearing source material and aqueous slurry are rehydrated by addition of one or more acids selected from the group consisting of inorganic acids and organic acids.

37. The process claimed in claim 36, wherein the one or more acids are selected from the group consisting of hydrochloric acid, nitric acid, acetic acid and humic acid.

38. The process claimed in claim 1, wherein one or more alkali bases, salts or mixtures thereof are added to the aqueous nanocluster slurry to peptize nanoclusters present therein, thereby regenerating nanocluster colloids.

39. The process claimed in claim 1, wherein the aqueous nancluster slurry is treated by a combination of elevated temperature and/or elevated pressure, and agitation to effect gel hydration and nanocluster peptization.

40. The process claimed in claim 1, wherein one or more dispersants are added to the aqueous nanocluster slurry to promote dispersion of host substrate.

41. The process claimed in claim 40, wherein said one or more dispersants are selected from the group consisting of ammonium and alkali hydroxides, polyphosphates, silicates, carbonates and polyelectrolytes.

42. The process claimed in claim 1, wherein the desorbing step is performed by addition of acids or bases to modify pH of the aqueous nanocluster slurry in such a manner that the nanoclusters are desorbed from the host substrate and enter into aqueous solution as nanocluster colloids.

43. The process claimed in claim 1, wherein one or more members selected from the group consisting of alkali and ammonium salts of chlorides, sulphates, thiosulphates, and peroxydisulphates, are added to the aqueous nanocluster colloid solution to promote stabilization of the nanocluster colloids.

44. The process claimed in claim 1, wherein the treating step is by adsorption using a sorbent of activated carbon.

45. The process claimed in claim 1, wherein the treating step is by ion exchange using an ion exchange resin.

46. The process claimed in claim 1, wherein the treating step is by passing the nanocluster colloid solution through a column loaded with a sorbent or ion exchange resin to provide isolated nanocluster colloids on said column.

47. The process claimed in claim 1, where the nanocluster colloids are recovered by contacting the aqueous nanocluster slurry with sorbents or ion exchange resins prior to decanting depleted most substrate and source material residue.

48. The process claimed in claim 1 where the nanoclusters are further processed to recover macrocrystalline solids.

49. The process claimed in claim 1, wherein the nanocluster concentrate is further processed to recover macrocrystalline solids.

50. The process claimed in claim 49 where the nanocluster concentrate is dissolved by one or more inorganic acids selected from the group consisting of hydrochloric acid, nitric acid, and sulfuric acid, and recovered by any combination of sorption, ion exchange, precipitation, electrowinning or cementation.

51. The process claimed in claim 49 where the nanocluster concentrate is treated with an oxidizing agent selected from the group consisting of alkali peroxides, nitrates, chlorates, perchlorates and persulphates, their respective acids, and ozone.

52. The process claimed in claim 49 where the nanocluster concentrate is treated with a reducing agent selected from the group consisting of alkali borohydrates, alkali sulphides, and organic acids.

53. The process claimed in claim 49 wherein the nanocluster concentrate is subjected to a combination of heat and pressure treatment under controlled atmosphere conditions to produce a macrocrystalline solid.

54. The process claimed in claim 53 wherein the controlled atmosphere conditions are an oxidizing atmosphere obtained by introduction of one or more oxidizing gases.

55. The process claimed in claim 54, wherein the one or more oxidizing gases are selected from the group consisting of oxygen, sulfur dioxide, and nitrous oxide.

56. The process claimed in claim 53 wherein the controlled atmosphere conditions are a reducing atmosphere obtained by introduction of one or more reducing gases.

57. The process claimed in claim 56, wherein the one or more reducing gases are selected from the group consisting of hydrogen, hydrogen sulfide and hydrocarbon gases.

58. The method of claim 1, wherein said geologic source material is a member selected from the group consisting of rocks, soils, unconsolidated sediments, solid bitumens, coals, peats, trees, plants, tailings, waste rock from mining and mineral beneficiation operations, fly ash, coke, and processed derivates thereof.

* * * * *